(12) United States Patent
Braun et al.

(10) Patent No.: US 7,028,451 B2
(45) Date of Patent: Apr. 18, 2006

(54) VERTICAL TUBULAR BAGGING MACHINE

(75) Inventors: Harald Braun, Gruenberg (DE); Walter Baur, Gruendau (DE)

(73) Assignee: Rovema Verpackungsmaschinen GmbH, Fernwald (DE)

( * ) Notice: Subject to any disclaimer, the term of this patent is extended or adjusted under 35 U.S.C. 154(b) by 14 days.

(21) Appl. No.: 10/880,433

(22) Filed: Jun. 29, 2004

(65) Prior Publication Data
US 2005/0039422 A1 Feb. 24, 2005

(30) Foreign Application Priority Data
Jul. 9, 2003 (DE) ................. 103 30 851

(51) Int. Cl.
*B65B 9/06* (2006.01)
(52) U.S. Cl. .......................... 53/550; 53/551
(58) Field of Classification Search ................. 53/550, 53/551, 552, 554, 451
See application file for complete search history.

(56) References Cited

U.S. PATENT DOCUMENTS

| | | | |
|---|---|---|---|
| 3,785,410 A * | 1/1974 | Carter ........................ 141/10 |
| 4,129,976 A * | 12/1978 | Grundler et al. ............. 53/552 |
| 4,241,563 A * | 12/1980 | Muller et al. ................ 53/511 |
| 4,829,745 A | 5/1989 | Behr et al. |
| 4,924,655 A | 5/1990 | Posey |
| 5,832,700 A * | 11/1998 | Kammler et al. ............. 53/502 |
| 5,930,983 A | 8/1999 | Terminella et al. |
| 6,052,970 A * | 4/2000 | Fujimoto et al. ............. 53/451 |
| 6,202,387 B1 * | 3/2001 | Brown et al. ................. 53/419 |
| 6,651,858 B1 * | 11/2003 | Shen ......................... 226/176 |
| 6,705,063 B1 * | 3/2004 | Topfer et al. ................. 53/577 |

FOREIGN PATENT DOCUMENTS

| | | |
|---|---|---|
| CH | 490 995 | 7/1970 |
| DE | 3841056 A1 | 6/1989 |
| EP | 0818389 A1 | 1/1998 |
| JP | 3085208 | 4/1991 |

* cited by examiner

*Primary Examiner*—Eugene Kim
(74) *Attorney, Agent, or Firm*—Flynn, Thiel, Boutell & Tanis, P.C.

(57) ABSTRACT

In order to be able to remove in a vertical tubular bagging machine in a simple manner a worm-dosing means stored in a fill pipe, it is suggested that the fill pipe is formed out of two troughs aligned against one another with their insides, and that a trough is releasably connected to the other trough. One trough is in a preferred embodiment connected to the other trough via a swivel joint, and a fastening device is provided for locking the trough, which can be swung away, in a position supported by the other trough, so that the swingable trough can be swung away in order to remove the worm-dosing means laterally out of the opened fill pipe.

7 Claims, 5 Drawing Sheets

VERTICAL TUBULAR BAGGING MACHINE

FIELD OF THE INVENTION

The invention relates to a vertical tubular bagging machine according to the generic terms of Claim 1.

BACKGROUND OF THE INVENTION

Vertical tubular bagging machines are used to create and fill tubular bags and are commonly known. A foil web unwound from a storage roller is reshaped on these machines into a vertically aligned foil tube by means of a forming shoulder. The foil tube surrounds a fill pipe for filling of the foil tube. The lower tube end is filled, welded and separated from the remaining foil tube in order to create tubular bags filled in this manner.

Depending on the type of bag to be created, varying forming shoulders and fill pipes are utilized. Generally, a forming shoulder consists of a one-part shoulder sleeve, over which the flat foil web runs in order to reach a guiding edge. The foil web is then reshaped at the guiding edge in order to move on as a vertically aligned foil tube after passing the guiding edge. The foil tube runs thereby through an annular passage, which is defined on the outside by a shoulder connection and on the inside by the fill pipe.

When packaging a flowable, for example powdery, product, it is common to use a worm-dosing means for the volumetric determination of the product mass to be packaged. The worm-dosing means consists of a dosing worm in a worm pipe. A drive rotates the dosing worm in the worm pipe. According to each one specified angle of rotation, the product volume given off by the worm-dosing means corresponds to the fill mass specified per tubular bag. The worm pipe is provided in the fill pipe.

The known tubular bagging machine has the disadvantage that it is relatively complicated to place a worm-dosing means into a fill pipe or to remove same therefrom. During insertion into the fill pipe, this relatively long and heavy assembly must be first lifted upwardly and then be let down again in order to move into the fill pipe. A relatively high installation space above the fill pipe is necessary for the installation of the worm-dosing means, which is up to 1.60 m long. In addition, this work cannot be done by one person alone.

SUMMARY OF THE INVENTION

The basic purpose of the invention is to further develop a vertical tubular bagging machine according to the generic terms of Claim 1 in such a manner that the installation of a worm-dosing means is simpler, and that a high installation space is no longer needed above the fill pipe.

The purpose is attained according to the characterizing part of Claim 1. The installation friendliness of the tubular bagging machine is improved since the fill pipe is formed out of two troughs with their insides aligned opposite one another, whereby one trough is releasably connected to the other trough. This has the advantage that after removing the forming shoulder the fill pipe can be opened by removing one trough. A dosing worm, which is provided in the fill pipe and which is very often utilized when dosing powder or granulate, can be removed in a simple manner laterally out of the fill pipe. A complicated pulling out of a relatively long and heavy dosing worm, generally hindered by upper components, is thus avoided. The lateral removal of the dosing worm has in addition the advantage that the space above the dosing worm can be utilized for other important assemblies, that is, it need no longer be reserved, or this space can be entirely eliminated, which results in a more compact design and thus less space for the vertical tubular bagging machine. An easy cleaning is possible when the fill pipe is in its open state.

Further advantageous developments of the suggested tubular bagging machine are described in Claims 2 to 8.

The conveyor worm is most easily lifted out of the fill pipe in direction of the longitudinal-sealing device, since a suitable free space exists there because of the design of the machine. This is possible when, analogous to Claim 2, the releasable trough is provided in the area of the adjoining edges of the foil tube.

In principle, many techniques are conceivable to easily release the troughs and to thus connect them with one another in an operatively friendly manner. Thus it is possible to connect the troughs to one another in a technically simple manner through a plug connection (Claim 4). Or one trough is connected to the other trough via a swivel joint, and a fastening device is provided for locking the trough, which can be swung away, in a position supported by the other trough (Claim 3). After releasing the fastening device, a trough can in this manner be swung away in order to remove a worm-dosing means (Claim 7).

A lateral removal of a worm-dosing means is further simplified when, analogous to Claim 5, the shoulder sleeve is formed of two separate sleeve parts, and the shoulder connection is formed of two separate connection parts, each one sleeve part and one adjoining connection part describe one component, the two components form the forming shoulder, and one component can be removed from the other component in order to be able to remove the fill pipe or a trough transversely with respect to the transport direction, thus laterally out of the forming shoulder.

Thus the forming shoulder need not be removed in order to release a trough. The forming shoulder is merely opened, just like the fill pipe in order to remove a worm-dosing means.

If a rear component is provided on the tubular bagging machine, which rear component is positioned toward the incoming foil web, and a front component is positioned in the area of the adjoining edges of the foil web (Claim 6), then on the one hand a location-precise run of the foil web to the guiding edges and on the other hand a location-precise run of the edges of the foil web toward a longitudinal-sealing device is achieved.

A simple opening of the forming shoulder can occur when one component is connected to the other component via a plug connection. Then merely one component is pulled off the other in order to be able to open the fill pipe. In the alternative, one component is connected through a swivel joint and a fastening device with the other component (Claim 7). The swingable component is then simply swung away in order to release a trough, for example, also by means of swinging away.

BRIEF DESCRIPTION OF THE DRAWINGS

The invention will be described in greater detail hereinafter in connection with the figures illustrating exemplary embodiments. In the drawings.

DETAILED DESCRIPTION

Figure 1:
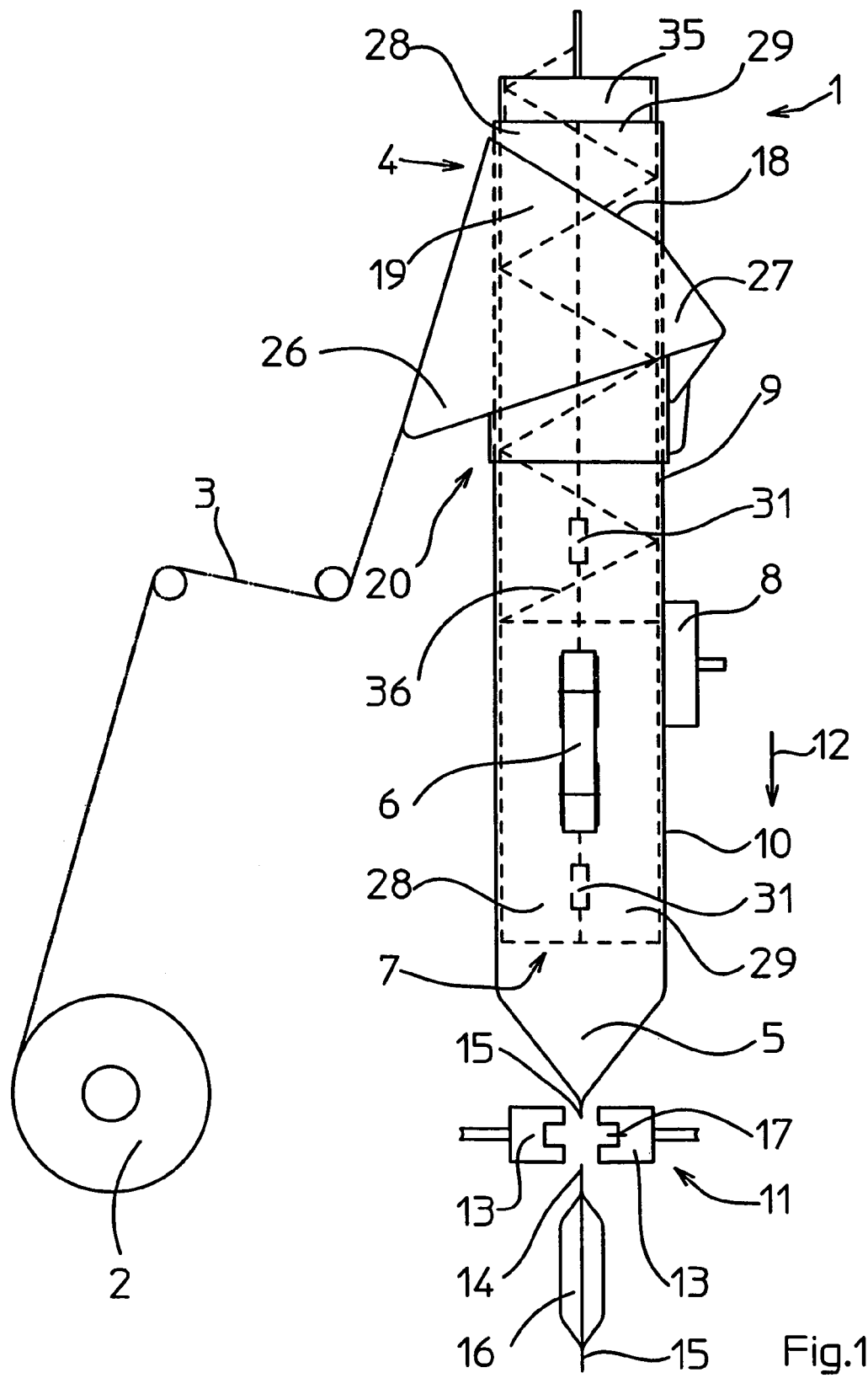
FIG. 1 is a side view of a vertical tubular bagging machine with a foil web unwound from a storage roller, a forming shoulder for reshaping the foil web into a foil tube, a longitudinal-sealing device and a cross-sealing device for welding of the foil tube, and a fill pipe for receiving and filling of the foil tube, a worm-dosing means within the fill pipe, whereby the forming shoulder is formed out of two components, which each include a sleeve part and a connection piece, and the fill pipe consists of two troughs, whereby one trough can be released from the other trough.

A foil web 3 is unwound from a storage roller 2 in a vertical tubular bagging machine 1 (FIG. 1). A forming shoulder 4 is utilized to reshape the foil web 3 into a foil tube 5. A foil-removing means 6 is used to further transport the foil web 3 and the foil tube 5. A vertically aligned fill pipe 7 is provided for receiving and filling of the foil tube 5. A longitudinal sealing device 8 is used to weld the edges 9 of the foil web 3 and thus to create a longitudinal sealing seam 10 of the foil tube 5. A cross-sealing device 11 with welding jaws 13, which are movable against one another and weld the foil tube 5 transversely with respect to its transport direction 12, is provided to create top seams 14 and bottom seams 15 on tubular bags 16.

Figure 2:
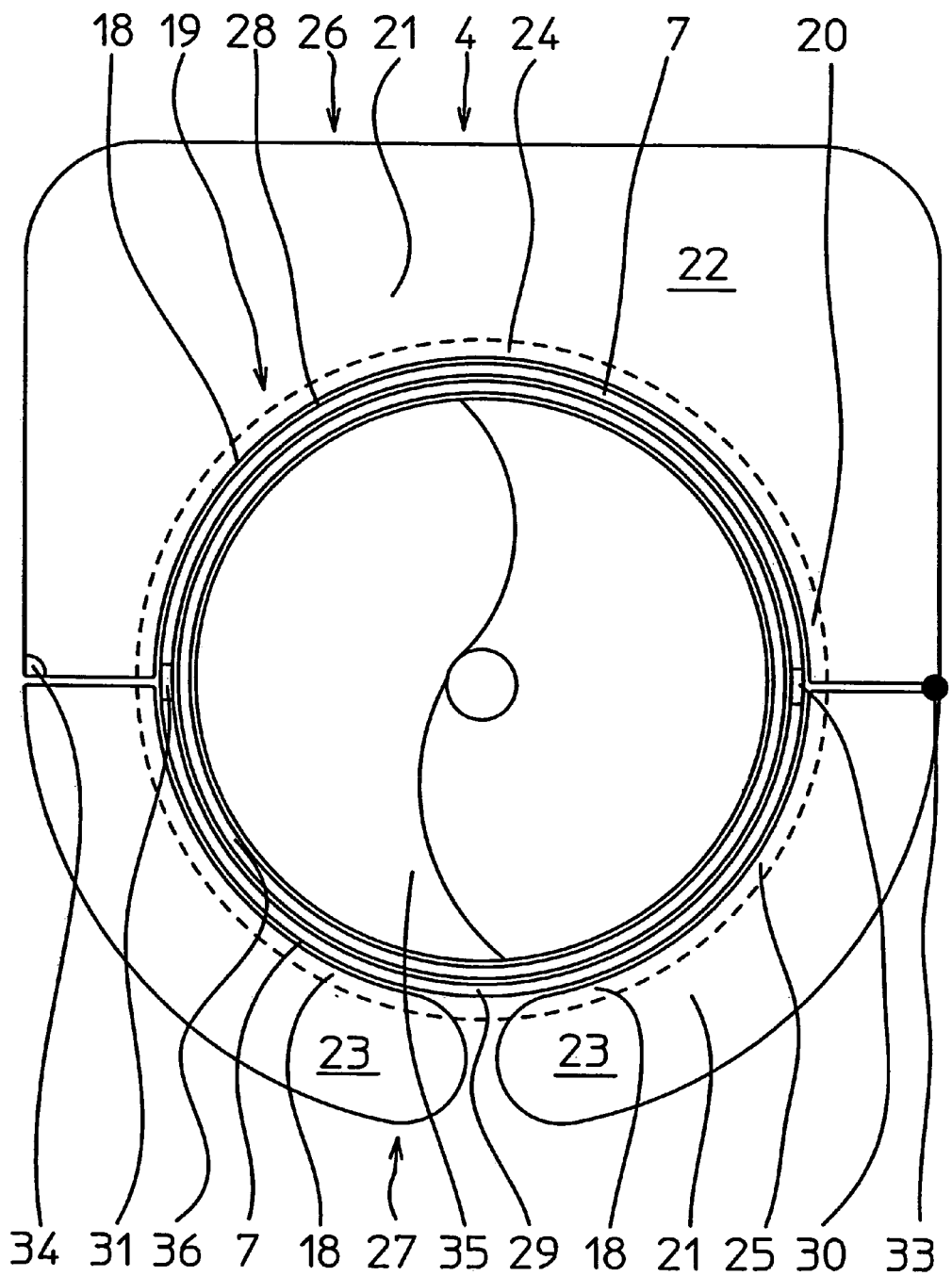
FIG. 2 is a view from above of the forming shoulder together with the two troughs and the worm-dosing means of FIG. 1, whereby both the forming shoulder and also the fill pipe are closed.

A separating device 17 is used to separate the tubular bag 16 from the foil tube 5. The forming shoulder 4 has a guiding edge 18 at one upper edge 19 of the shoulder connection 20 surrounding the fill pipe 7, also a shoulder sleeve 21 fastened to the curved guiding edge 18 and pointing outwardly away from the guiding edge 18 (FIG. 2). The shoulder sleeve 21 is formed out of two separate sleeve parts 22, 23. The shoulder connection 20 consists of two separate connection pieces 24, 25. Each one sleeve part 22, 23 and an adjoining connection part 24, 25 form a component 26, 27. The two components 26, 27 describe the forming shoulder. One component 27 can be removed from the other component 26 in order to reach the fill pipe 7.

A rear component 26 is provided, which is positioned toward the incoming foil web 3, and a front component 27 in the area of the adjoining edges 9 of the foil tube 5. The front component 27 is connected to the rear component 26 via a swivel joint 33 and a fastening device 34.

Figure 3:
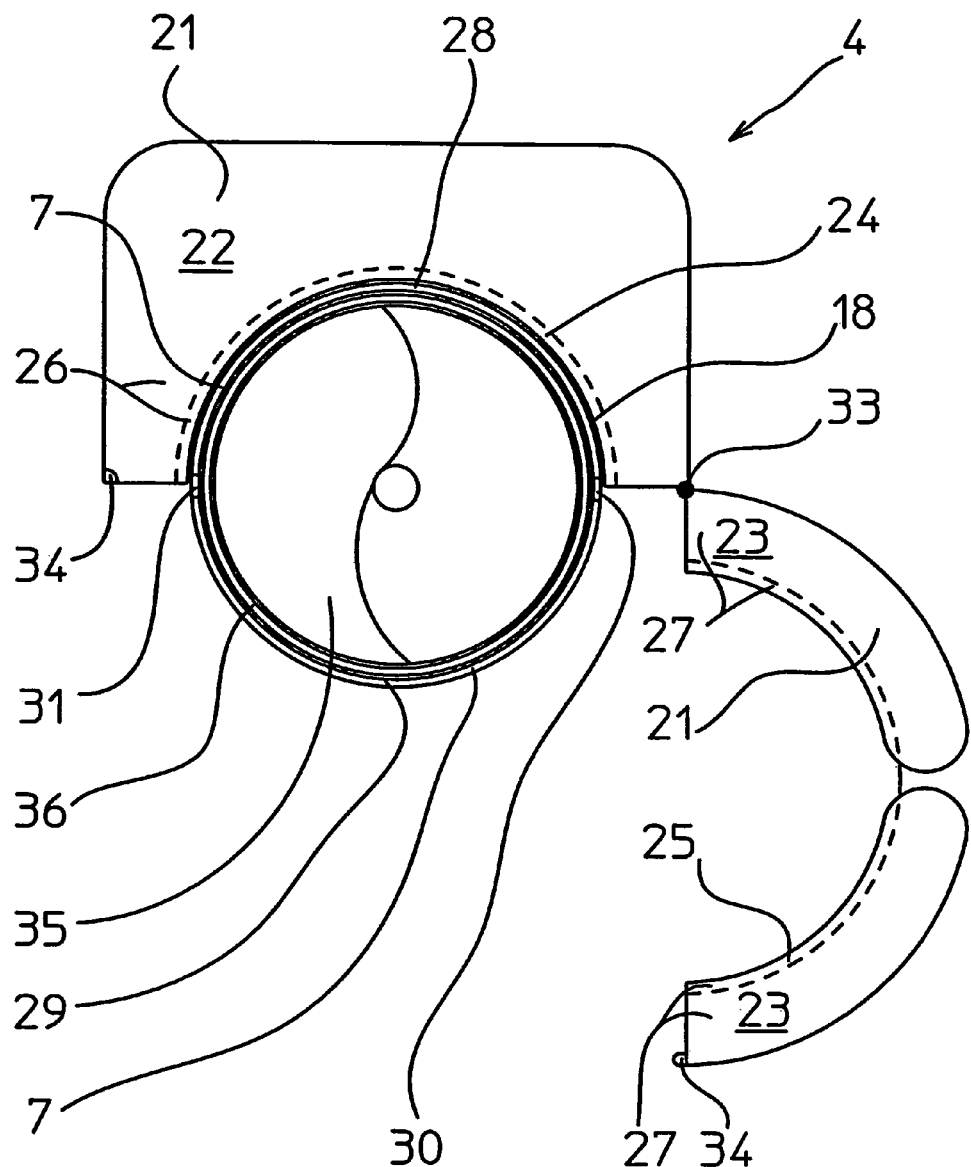
FIG. 3 is a view from above of the subject matter of FIG. 2, however, with the forming shoulder being open.

In order to reach the fill pipe 7, the fastening device 34, which has a locking mechanism, is released, and the front component 26 of the forming shoulder 4 is swiveled about the swivel joint 33 in order to open the forming shoulder 4 (FIG. 3).

The fill pipe 7 consists of two troughs 28, 29, which are directed against one another with their insides, whereby one trough 29 is releasably connected to the other trough 28. The releasable trough 29 is provided in the area of the adjoining edges 9 of the foil tube 5. The releasable trough 29 is connected to the other trough 28 via a swivel joint 30. A fastening device 31 with locking mechanism is utilized to lock the trough 29, which can be swung away, in a position supported by the other trough 28. After the front trough 29 has been swung away, a worm-dosing means 37 is revealed, which is provided between the troughs 28, 29, and which has a dosing worm 35 with a worm pipe 36 surrounding the dosing worm 35, and which serves to provide a product dosing.

The worm-dosing means 35 can now be removed in a simple manner transversely with respect to the transport direction 12 forwardly out of the fill pipe 7 and out of the forming shoulder 4.

Figure 4:
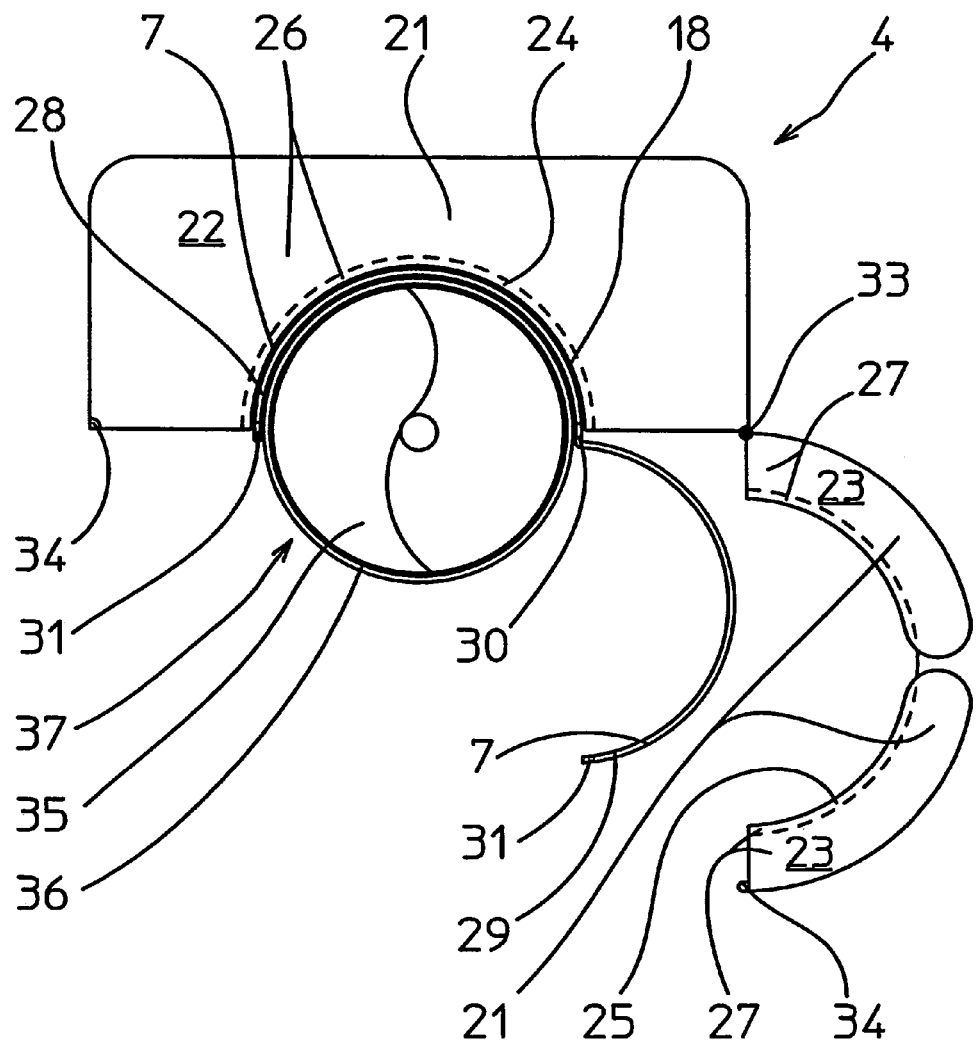
FIG. 4 is a view from above of the subject matter of FIG. 3, however, in addition with the fill pipe being open in order to be able to remove the worm-dosing means, consisting of a dosing worm and a worm pipe, laterally out of the fill pipe.
Figure 5:
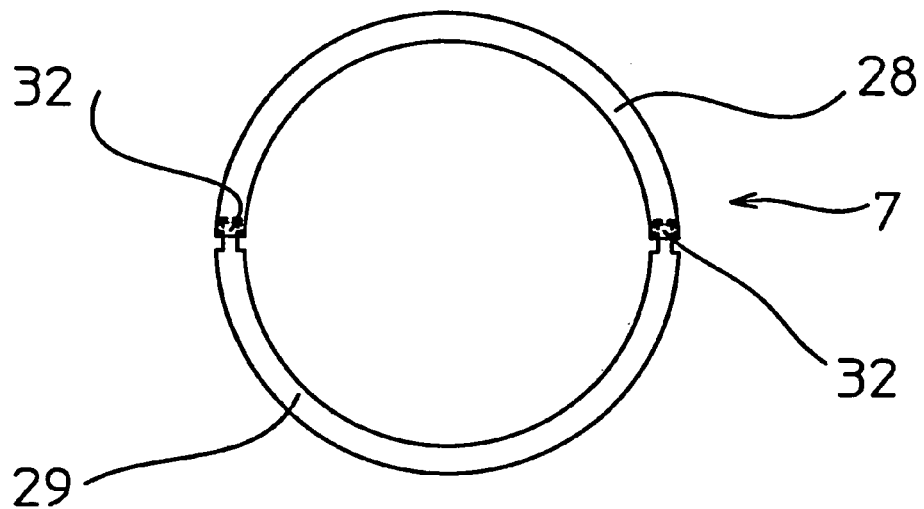
FIG. 5 is a view from above of two troughs forming a fill pipe, which troughs are connected through a plug connection.
Figure 6:
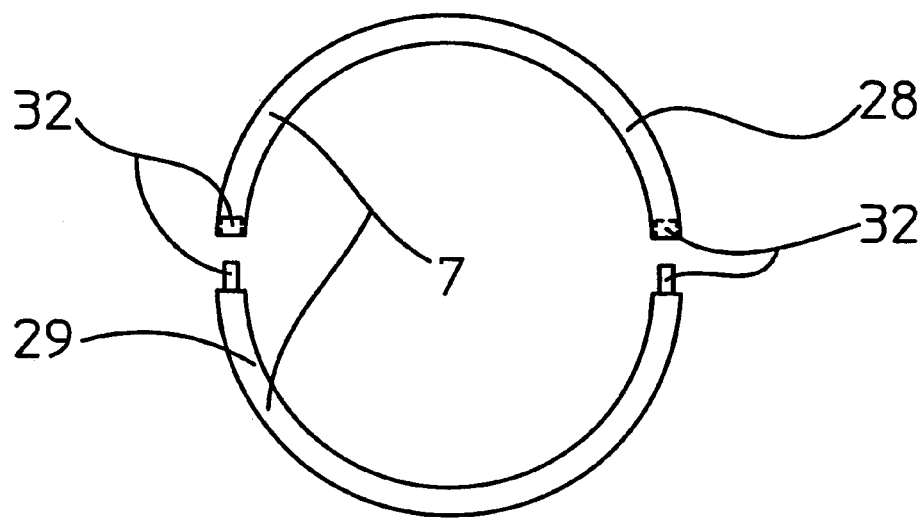
FIG. 6 is a view from above of the subject matter of FIG. 5, however, with the plug connection being released.

The two troughs 28, 29 forming the fill pipe 7 are in the exemplary embodiment of FIGS. 4 and 5 connected with one another through a simple, releasable and again connectable plug connection. After the front trough 29 has been removed from the rear trough 28, it is possible to remove or insert in the same manner as in the preceding exemplary embodiment a worm-dosing means from the fill pipe 7 or into said fill pipe 7. First a one-piece forming shoulder must be completely removed or a two-part forming shoulder must be opened. Besides reaching a worm-dosing means, a removable trough 29 also serves to open the fill pipe 7 in order to reach, for example, a deionization device, a protective-gas feed or another assembly arranged in the fill pipe 7 and known in the packaging industry.

What is claimed is:

1. A vertical tubular bagging machine comprising a foil web unwound from a storage roller, a forming shoulder for reshaping the foil web into a foil tube, a foil-removing device for the further transport of the foil web and of the foil tube, a vertically aligned fill pipe for receiving and filling of the foil tube, a longitudinal-sealing device for welding of edges of the foil web and thus for creating a longitudinal sealing seam of the foil tube, a cross-sealing device with welding jaws, which are movable against one another and weld the foil tube transversely with respect to its transport direction, for creating top seams and bottom seams on tubular bags, and a separating device for separating the tubular bag from the foil tube, wherein the forming shoulder has a curved guiding edge at an upper edge of a shoulder connection surrounding the fill pipe and a shoulder sleeve fastened to the curved guiding edge and pointing outwardly away from the guiding edge, wherein the shoulder sleeve is formed of two separate sleeve parts, wherein the shoulder connection is formed of two separate connection pieces, such that each said one sleeve part and an adjoining said connection piece form a component, wherein the two components define the forming shoulder, wherein the fill pipe is formed out of two troughs aligned against one another, with one said trough being releasably connected to the other trough to enable access into an interior of the fill pipe, and wherein one said component can be removed from the other component in order to be able to remove the releasable trough of the fill pipe transversely with respect to the transport direction from the forming shoulder.

2. The tubular bagging machine according to claim 1, wherein the releasable trough is provided in the area of the adjoining edges of the foil tube.

3. The tubular bagging machine according to claim 1, wherein the releasable trough is connected to the other trough via a swivel joint, and a fastening device is provided for locking the trough, which can be swiveled away, in a position supported by the other trough.

4. The tubular bagging machine according to claim 1, wherein the troughs are connected with one another through a plug connection.

5. The tubular bagging machine according to claim 1, wherein one said component comprises a rear component which is positioned toward the incoming foil web, and another said component comprises a front component located in the area of the adjoining edges of the foil tube.

6. The tubular bagging machine according to claim 1, wherein one said component is connected to the other said component through a swivel joint and a fastening device.

7. The tubular bagging machine according to claim 1, wherein a dosing worm with a worm pipe surrounding the dosing worm is provided in the fill pipe.

* * * * *